United States Patent
Axelsson et al.

(10) Patent No.: US 12,144,296 B2
(45) Date of Patent: Nov. 19, 2024

(54) METHOD AND APPARATUS FOR PROVIDING A NOVELTY WATERING SYSTEM

(71) Applicants: Ericka Axelsson, Woodstock, GA (US); Jim Axelsson, Woodstock, GA (US)

(72) Inventors: Ericka Axelsson, Woodstock, GA (US); Jim Axelsson, Woodstock, GA (US)

( * ) Notice: Subject to any disclaimer, the term of this patent is extended or adjusted under 35 U.S.C. 154(b) by 0 days.

(21) Appl. No.: 18/075,001

(22) Filed: Dec. 5, 2022

(65) Prior Publication Data
US 2023/0397556 A1    Dec. 14, 2023

Related U.S. Application Data

(63) Continuation-in-part of application No. 17/838,186, filed on Jun. 11, 2022.

(51) Int. Cl.
*A01G 27/02*    (2006.01)
*A01G 27/00*    (2006.01)

(52) U.S. Cl.
CPC ........... *A01G 27/02* (2013.01); *A01G 27/008* (2013.01)

(58) Field of Classification Search
CPC .... A01K 27/00; A01K 27/005; A01K 27/008; A01K 25/02; A01G 27/00; A01G 27/005; A01G 27/008; A01G 25/02
See application file for complete search history.

(56) References Cited

U.S. PATENT DOCUMENTS

| | | | |
|---|---|---|---|
| 2018/0100666 A1* | 4/2018 | Park | F24F 6/04 |
| 2018/0325044 A1* | 11/2018 | Tilley | A01G 9/12 |
| 2018/0368340 A1* | 12/2018 | Ielo | A01G 9/02 |
| 2018/0368342 A1* | 12/2018 | Purcell | A01G 27/005 |
| 2019/0116742 A1* | 4/2019 | Denton | B05B 15/625 |
| 2020/0344965 A1* | 11/2020 | Song | H05B 47/16 |
| 2021/0140656 A1* | 5/2021 | Seo | C02F 1/46104 |
| 2022/0159915 A1* | 5/2022 | Ayres | A01G 9/0297 |
| 2022/0312695 A1* | 10/2022 | Masarwa | A01G 27/006 |
| 2022/0369566 A1* | 11/2022 | Venkata | A01G 9/16 |
| 2023/0165201 A1* | 6/2023 | Hausauer | A01G 9/02 47/79 |
| 2023/0172119 A1* | 6/2023 | Lee | A01G 27/008 47/66.1 |

OTHER PUBLICATIONS

Sutcliffe, (20220609) Retrieved from https://www.etsy.com/listing/1185591218/3d-printed-rain-cloud-plant-waterer?click_key=3dbf829995f9a103a90fe165d75a4ca73de65a8e%3A1185591218&click_sum=434f15e8&ref=internal_similar_listing_bot-2&sts=1&listing_id=1185591218&listing_slug=3d-printed-rain-cloud (Year: 2022).*

Brandon, (20220522) Retrieved from https://www.etsy.com/listing/1205638363/rain-cloud-20-plant-watering-accessory?ga_order=most_relevant&ga_search_type=all&ga_view_type=gallery&ga_search_query=rain+cloud+%283+inch+pot+size%29&ref=sc_gallery-1-1&plkey=6308149f8ecbb7f8ec602e2b361acd2b12fed7d (Year: 2022).*

Disclosure of Item Sold on or About Jan. 27, 2021.

\* cited by examiner

*Primary Examiner* — Monica L Perry
*Assistant Examiner* — Aaron M Rodziwicz
(74) *Attorney, Agent, or Firm* — GRONHOLM PATENT SERVICES

(57) ABSTRACT

The present disclosure includes a novelty watering device for use in watering a plant positioned in a planting container, which provides various dripping characteristics including the simulation of water dripping from a cloud.

15 Claims, 19 Drawing Sheets

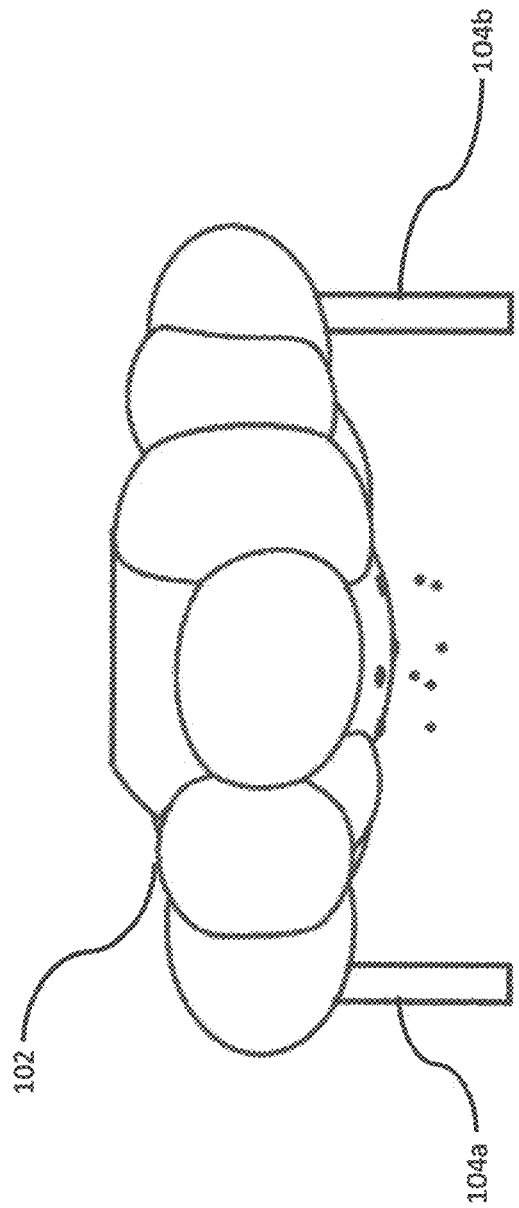

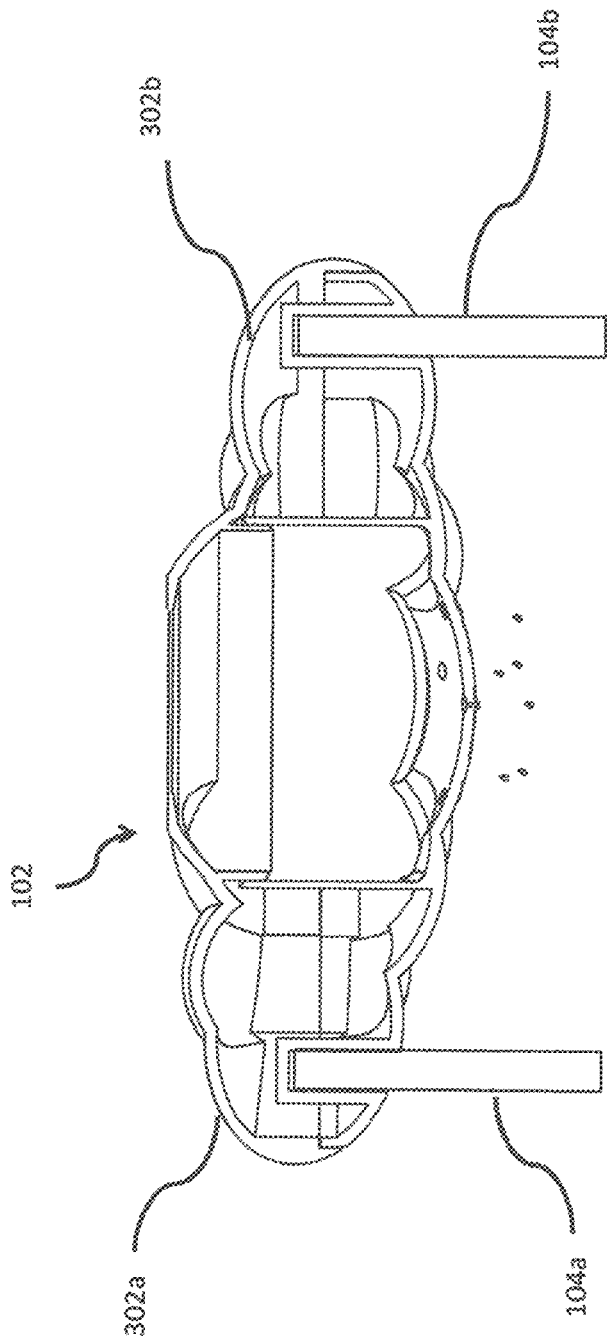

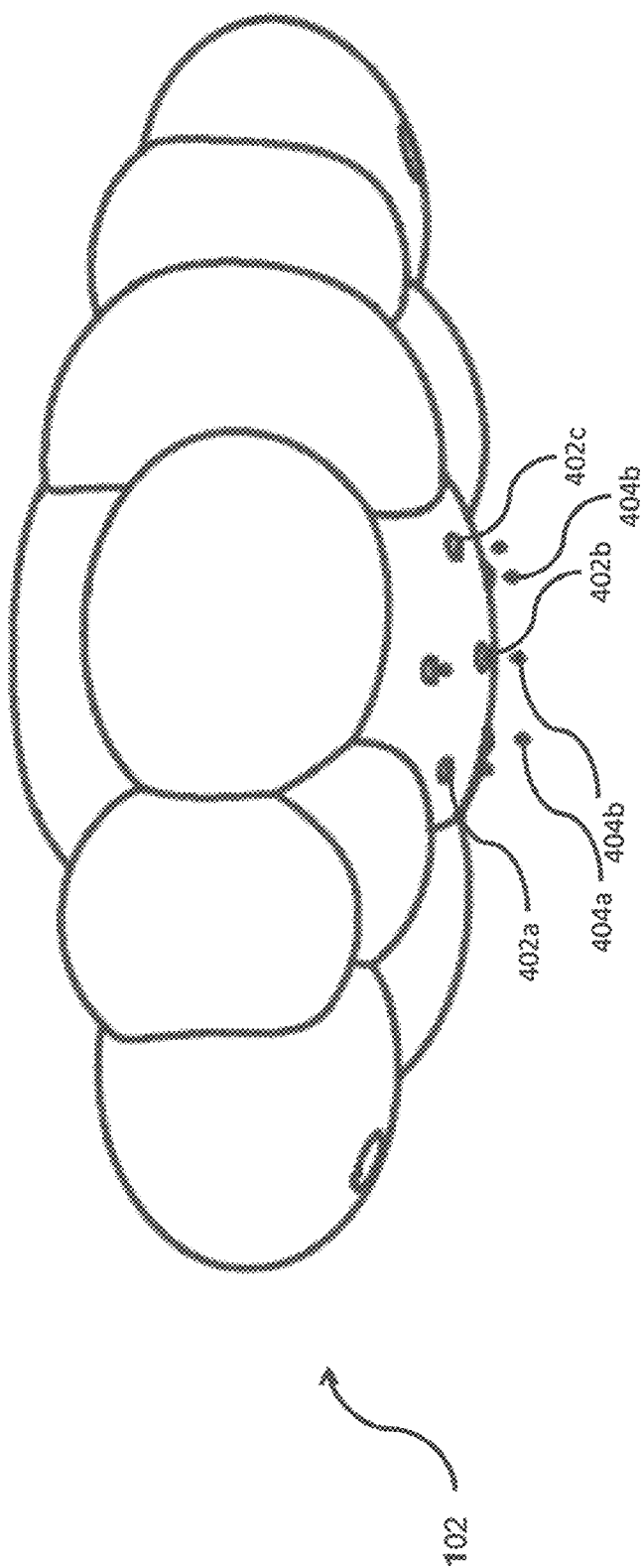

Interior 802 of Reservoir Tank 800

Exterior 804

Dripper Element 820

Lower Floor 801 of Reservoir Tank 800

Interior 802 of Reservoir Tank 800

Exterior 804

Central axis of passageway 821

Dripper Element 820 defining passageway 821

Droplet 12D

Inverted cone limits drop width

Size of through passage selected to prevent excessive emptying

Lower circular free edge of inverted exit cone limits drop width

Droplet 13D

Fig. 14
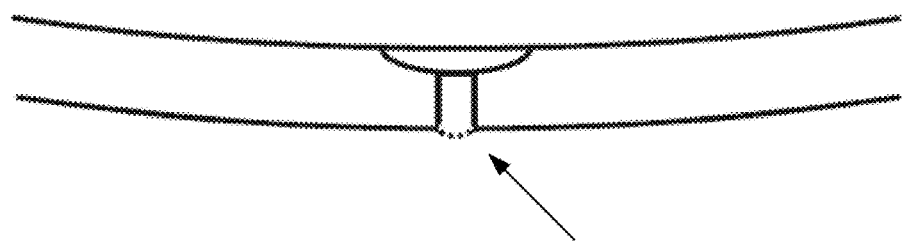
Droplet 14-D
Fig. 15A
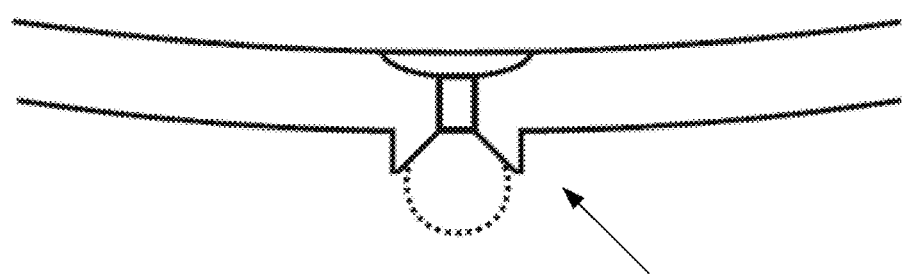
Droplet 15A-D
Fig. 15B
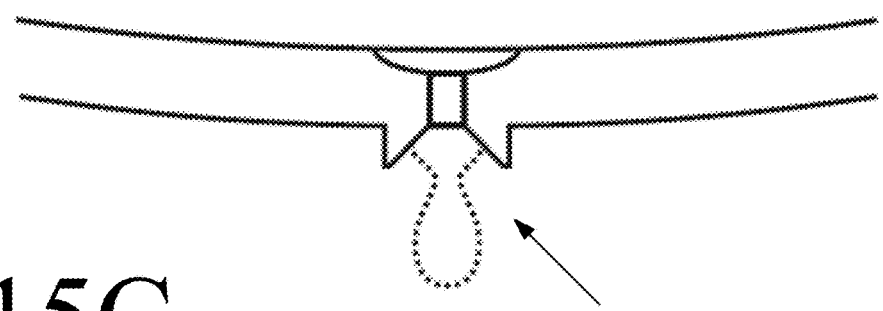
Droplet 15B-D
Fig. 15C
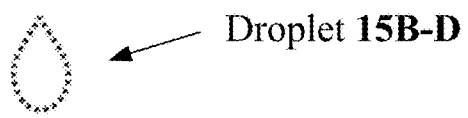
Droplet 15B-D

Fig. 16A   Correct passageway size
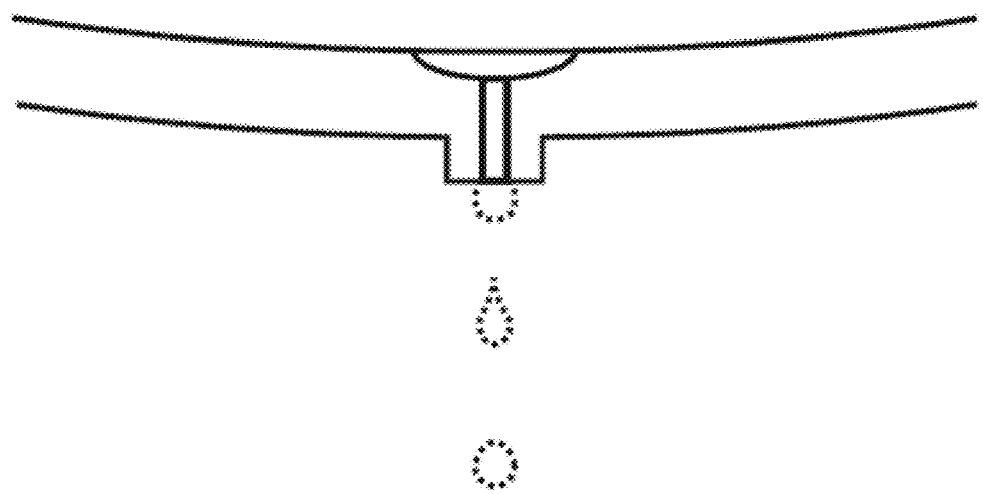
Fig. 16B   Incorrect passageway size
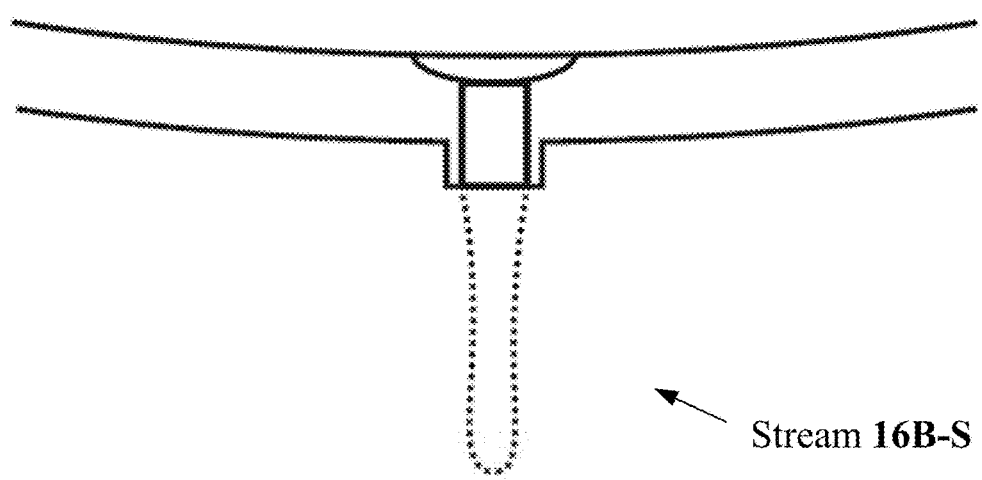
Stream 16B-S

Droplet 17A-D

Droplet 17B-D

Lower drip ring LDR

Droplet 17C-D

Droplet 17D-D

Lower drip ring LDR

Droplet 17E-D

Lower drip ring LDR
Droplet 17F-D

Lower drip ring LDR
Droplet 17G-D

Droplet 17H-D

METHOD AND APPARATUS FOR PROVIDING A NOVELTY WATERING SYSTEM

CROSS REFERENCE TO RELATED APPLICATIONS

This application claims the benefit and priority of prior filed nonprovisional applications, namely application no 17838186 filed Jun. 11, 2022. The entirely of same is also incorporated by reference.

FIELD

This disclosure relates generally to methods and apparatuses providing a watering feature, in particular a novelty-type watering feature.

SUMMARY

Typically, watering plants requires a manual method of pouring water by holding a container intended to disperse water on the plant. Traditionally, watering containers are held by a user or affixed to some complex equipment. Hence, the existing watering devices and systems suffer from several disadvantages such as, for example, requiring complex mechanisms to operate and being difficult to install due to complex methods of assembly. This specification recognizes that there is a necessity for a simple and cost-effective watering device for plants that can be used with a plant container as well as a stand.

According to embodiments illustrated herein, there may be provided a watering device for plants usable with a plant container. The watering device includes a water reservoir tank and two acrylic rods. The water reservoir tank is adapted to contain a predefined amount of water to prevent overwatering. The water reservoir tank is molded in a shape of a puffy cloud being cast into a one piece molded portion or two separate molded portions comprising a top portion and a bottom portion. The water reservoir tank comprises a plurality of drip holes to create a plurality of individual water drops to provide a pleasing aesthetic effect. The two acrylic rods include a top end and a bottom end. The top ends of the two acrylic rods are detachably attached to a proximal end and a distal end of the water reservoir tank. The bottom ends of the two acrylic rods are adaptable to be inserted into the plant container to allow the water reservoir tank to be suspended on the two acrylic rods.

In an aspect, the drip holes are surrounded by a textured surface so that water drops are prevented from wicking or pooling. The droppers in ideal conditions keep the "rain" nicely separate. In the event someone was to slightly overfill the reservoir and water spilled down the side, as a result of physical science, traditionally the water from the droplets would be attracted to the overflow water and begin to wick. This can be an issue where the bottom surface of a traditional reservoir is completely smooth, the added texture is to prevent the water from traveling horizontally and wicking as it exits from the drip holes. It will be appreciated that the textured design will maintain a more appealing appearance while preventing wicking.

In an aspect, the water reservoir tank includes an interior shape designed to maximize the downward force to ensure the water reservoir completely empties.

In an aspect, the top portion comprising a female attachment means and the bottom portion comprising a male attachment means, wherein the female attachment means and the male attachment means to allow the two separate molded portions of the water reservoir tank to detachably attach to the opposite member.

In an aspect, the water reservoir tank is configured such that the male attachment means is insertable into the female attachment means for a snap-fit engagement.

In an aspect, the female attachment means and the male attachment means are placed in a center of each separate molded portion.

In an aspect, the female attachment means and the male attachment means are surrounded by a silicone material to provide a tighter fit.

In an aspect, the predefined amount of water is in the range of 115 mL to 120 mL.

In an aspect, the two separate molded portions facilitate a user to open and clean the water reservoir tank.

In an aspect, the bottom ends of the two acrylic rods act as a stand so that the water reservoir tank is used for a small plant.

In an aspect, the water from the water reservoir tank is emptied in about 8-10 minutes.

In an aspect, the bottom portion of the water reservoir tank includes a first aperture and a second aperture.

In an aspect, the first aperture and the second aperture are configured to receive the top ends of the acrylic rods.

Accordingly, one advantage of the present invention is that the water reservoir tank is designed to hold a reasonable amount of water to prevent over-watering.

Accordingly, one advantage of the present invention is that the acrylic rods are adaptable to existing potted plants, and there is no need to use a specific pot.

Accordingly, one advantage of the present invention is that the drip holes are specifically made to create small individual drops making sure it has a pleasing aesthetic effect.

Accordingly, one advantage of the present invention is that the water reservoir tank can be separated into two parts so that the user can open it up for cleaning.

Accordingly, one advantage of the present invention is that the water reservoir tank includes a protruding cone design that surrounds the drip holes to keep the water drops nicely shaped.

Another aspect of the present invention includes a novelty watering device for use in watering a plant positioned in a planting container, said watering device itself comprising: A) A reservoir member configured to at temporarily contain a predetermined amount of water, such that said controlled passage of the water can drop in individual droplets of water downwardly therefrom, said reservoir member itself including a lower floor, said lower floor itself comprising the following adjacent elements: 1) a lower floor portion at least partially defining an upwardly facing reservoir portion configured to contain a volume of water; 2) a dripper element configured to allow the controlled passage of water, said dripper element itself comprising: i) a through channel portion defining a through channel cavity having a channel inlet end and a channel outlet end, said channel inlet end for accepting a portion of said volume of water from said upwardly facing reservoir portion into said through channel cavity, and said outlet end for routing said water portion out of said through channel portion; ii) a diverging cone frustrum portion defining a diverging cone frustrum shaped cavity having a cone inlet end and a cone outlet end, said cone inlet end configured to accept water from said channel outlet end such that said diverging cone frustrum shaped cavity accumulates a volume of water therein, prior to said volume of water becoming separated into a discrete drop and falling from said diverging cone frustrum portion; and B) at least one support member configured to support said container above said planting container, such that individual droplets of water can exit said dripper elements and fall upon said plant while in said planning container.

Another aspect of the present invention includes a novelty watering device as noted above, wherein said through channel portion includes an upwardly directed inlet cup proximate its channel inlet end.

Another aspect of the present invention includes a novelty watering device as noted above, wherein said through channel cavity is circular in cross section, 1.7 mm in length and 0.6 mm in diameter.

Another aspect of the present invention includes a novelty watering device as noted above, wherein said through diverging cone frustrum shaped cavity diverges at an angle in the range of 40-50 degrees.

Another aspect of the present invention includes a novelty watering device as noted above, wherein said through diverging cone frustrum shaped cavity diverges at an angle in the range of 30-60 degrees.

Another aspect of the present invention includes a novelty watering device for use in watering a plant positioned in a planting container, said watering device itself comprising: A) A reservoir member configured to temporarily contain a predetermined amount of water, such that said controlled passage of the water can drop in individual droplets of water downwardly therefrom, said reservoir member itself including a lower floor, said lower floor itself comprising the following adjacent elements: 1) a lower floor portion at least partially defining an upwardly facing reservoir portion configured to contain a volume of water, said lower floor portion defining a lower exterior surface portion; and 2) a dripper element configured to allow the controlled passage of water, said dripper element itself comprising: i) a through channel portion defining a through channel cavity having a channel inlet end and a channel outlet end, said channel inlet end for accepting a portion of said volume of water from said upwardly facing reservoir portion into said through channel cavity, and said outlet end for routing said water portion out of said through channel portion; ii) a diverging cone frustrum portion defining a diverging cone frustrum shaped cavity having a cone inlet end and a cone outlet end, said cone inlet end configured to accept water from said channel outlet end such that said diverging cone frustrum shaped cavity accumulates a volume of water therein, prior to said volume of water becoming separated into a discrete drop and falling from said diverging cone frustrum portion, said diverging cone frustrum portion including a downward protrusion portion, said downward protrusion portion extending downwardly a finite and predetermined distance from said arcuate surface of said lower exterior surface portion of said lower floor portion, such that said volume of water while in said diverging cone frustrum shaped cavity is discouraged from migrating laterally to said lower floor portion; and B) at least one support member configured to support said container above said planting container, such that individual droplets of water can exit said dripper elements and fall upon said plant while in said planning container.

Another aspect of the present invention includes a novelty watering device as noted above, wherein said through channel portion includes an upwardly directed inlet cup proximate its channel inlet end.

Another aspect of the present invention includes a novelty watering device as noted above, wherein said through channel cavity is circular in cross section, 1.7 mm in length and 0.6 mm in diameter.

Another aspect of the present invention includes a novelty watering device as noted above, wherein said through diverging cone frustrum shaped cavity diverges at an angle in the range of 40-50 degrees.

Another aspect of the present invention includes a novelty watering device as noted above, wherein said through diverging cone frustrum shaped cavity diverges at an angle in the range of 30-60 degrees.

Another aspect of the present invention includes a novelty watering device for use in watering a plant positioned in a planting container, said watering device itself comprising: A) A reservoir member configured to temporarily contain a predetermined amount of water, such that said controlled passage of the water can drop in individual droplets of water downwardly therefrom, said reservoir member itself including a lower floor, said lower floor itself comprising the following adjacent elements: 1) a lower floor portion at least partially defining an upwardly facing reservoir portion configured to contain a volume of water; 2) a dripper element configured to allow the controlled passage of water, said dripper element itself comprising: i) a through channel portion defining a through channel cavity having a channel inlet end and a channel outlet end, said channel inlet end for accepting a portion of said volume of water from said upwardly facing reservoir portion into said through channel cavity, and said outlet end for routing said water portion out of said through channel portion; ii) an expanded portion defining an expanded cavity having a expanded cavity inlet end and an expanded cavity outlet end, said cavity inlet end configured to accept water from said channel outlet end such that said expanded cavity accumulates a volume of water therein, prior to said volume of water becoming separated into a discrete drop and falling from said expanded cavity; and B) at least one support member configured to support said container above said planting container, such that individual droplets of water can exit said dripper elements and fall upon said plant while in said planning container.

Another aspect of the present invention includes a novelty watering device as noted above, wherein said through channel cavity is circular in cross section, 1.7 mm in length and 0.6 mm in diameter.

Another aspect of the present invention includes a novelty watering device as noted above, wherein said expanded portion has straight sides, providing a consistent transverse cross section throughout its length.

Another aspect of the present invention includes a novelty watering device as noted above, wherein said expanded portion has outwardly diverging sides, providing an increasing transverse cross section as taken downwardly along its length.

Another aspect of the present invention includes a novelty watering device for use in watering a plant positioned in a planting container, said watering device itself comprising: A) A reservoir member configured to at temporarily contain a predetermined amount of water, such that said controlled passage of the water can drop in individual droplets of water downwardly therefrom, said reservoir member itself including a lower floor, said lower floor itself comprising the following adjacent elements: 1) a lower floor portion at least partially defining an upwardly facing reservoir portion configured to contain a volume of water, said lower floor portion defining a lower exterior surface portion; and 2) a dripper element configured to allow the controlled passage of water, said dripper element itself comprising: a through channel portion defining a through channel cavity having a channel inlet end and a channel outlet end, said channel inlet end for accepting a portion of said volume of water from said upwardly facing reservoir portion into said through channel cavity, and said outlet end for routing said water portion out of said dripper element, said through channel portion including a downward protrusion portion, said downward protrusion portion extending downwardly a finite and predetermined distance from said arcuate surface of said lower exterior surface portion of said lower floor portion, such that said volume of water while at the lower end of said through channel cavity is discouraged from migrating laterally to said lower floor portion; and B) at least one support member configured to support said container above said planting container, such that individual droplets of water can exit said dripper elements and fall upon said plant while in said planning container.

Another aspect of the present invention includes a novelty watering device as noted above, wherein said through channel cavity is circular in cross section, 1.7 mm in length and 0.6 mm in diameter.

Another aspect of the present invention includes a novelty watering device as noted above, wherein said downward protrusion portion defines a lower ring which discourages water from wicking radially relative to said ring, said lower drip ring being greater in diameter than said through channel cavity.

Another aspect of the present invention includes a novelty watering device for use in watering a plant positioned in a planting container, said watering device itself comprising: A) A reservoir member configured to temporarily contain a predetermined amount of water, such that said controlled passage of the water can drop in individual droplets of water downwardly therefrom, said reservoir member itself including a lower floor, said lower floor itself comprising the following adjacent elements: 1) a lower floor portion at least partially defining an upwardly facing reservoir portion configured to contain a volume of water; and 2) a dripper element configured to allow the controlled passage of water, said dripper element itself comprising: a through channel portion defining a through channel cavity having a channel inlet end and a channel outlet end, said channel inlet end for accepting a portion of said volume of water from said upwardly facing reservoir portion into said through channel cavity, and said outlet end for routing said water portion out of said through channel portion, said through channel cavity being defined by a water impervious surface.

Another aspect of the present invention includes a novelty watering device as noted above, wherein said reservoir member is injection molded in order to provide said water impervious surface.

Another aspect of the present invention includes a novelty watering device as noted above, wherein said reservoir member is injection molded of PLA plastic in order to provide said water impervious surface.

These and other features and advantages of the present disclosure may be appreciated from a review of the following detailed description of the present disclosure, along with the accompanying figures in which reference numerals refer to like parts throughout.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another and vice versa. Further, the elements may not be drawn to scale.

Various embodiments will hereinafter be described in accordance with the appended drawings, which are provided to illustrate and not to limit the scope in any manner, wherein similar designations denote similar elements, and in which:

FIG. 3A is a perspective view of the two acrylic rods inserted into the water reservoir tank, in accordance with at least one embodiment.

FIG. 3B is a cross-sectional view of the watering device that depicts how the top portion of the two acrylic rods can be detachably attached to a proximal end.

FIG. 5A is a perspective view of various drip holes of the water reservoir tank, in accordance with at least one embodiment.

FIG. 14 is a view of a droplet 14-D falling from a passageway only. A cup is shown at its upper end.

FIGS. 15A-C are comparative views showing the impact of a cone frustrum, showing the water being drawn into the frustrum shape, thus overcoming surface tension that might have stopped flow in the configuration shown in FIG. 14.

FIGS. 16A-B are comparative views. FIG. 16A shows an ideal sized passage creating a desirable slow drip 16A-D. FIG. 16B shows a larger sized passage that just allows the water to flow freely (stream) as 16B-S, which is not as desirable in comparison.

FIG. 17A is a droplet 17A-D falling from a configuration not including a downward protrusion and not including an expanded cavity at the end of the passageway. FIG. 17B is a droplet 17B-D falling from a configuration including a downward protrusion with square corners and not including an expanded cavity at the end of the passageway. FIG. 17C is a droplet 17C-D falling from a configuration including a downward protrusion with rounded corners, like a donut and not including an expanded cavity at the end of the passageway. FIG. 17D is a droplet 17D-D falling from a configuration including a lower protrusion composed of an inverted cone and not including an expanded cavity at the end of the passageway. FIG. 17E is a droplet 17E-D falling from a configuration similar to FIG. 9, including a larger cone frustrum cavity at the end of the passageway and including a downward protrusion.

FIG. 17F is a droplet 17F-D falling from a configuration including an expanded cavity at the end of the passageway with the cavity flaring out at a gradually increasing angle. FIG. 17G is a droplet 17G-D falling from a configuration including an expanded cavity at the at the end of the passageway, with the cavity flaring out at a gradually decreasing angle, forming a downwardly opening cup at the exit. FIG. 17H is a droplet 17H-D falling from a configuration not including an expanded cavity at the at the end of the passageway, but with a rounded downwardly protruding "nipple".

DETAILED DESCRIPTION

Introduction

The present invention now will be described more fully hereinafter with reference to the accompanying drawings, in which some, but not all embodiments of the inventions are shown. This invention may be embodied in many different forms and should not be construed as limited to the embodiments set forth herein; rather, these embodiments are provided so that this disclosure will satisfy applicable legal requirements. Like numbers refer to like elements throughout.

Reference is now made to the figures, in which like elements indicate like elements throughout the several views.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the apparatuses, methods, and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

More Details

Figure 1:
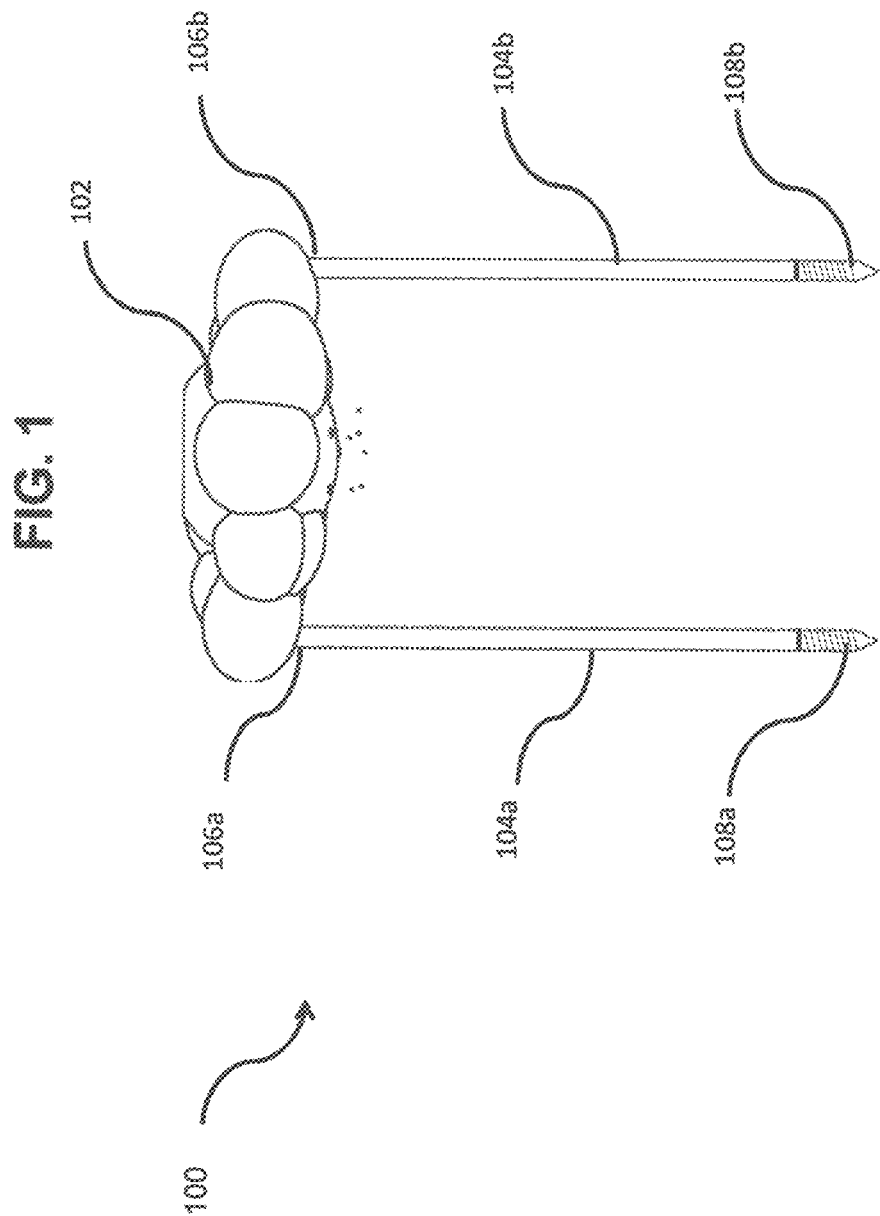
FIG. 1 is a perspective view of various key components i.e., a water reservoir tank, and two acrylic rods of a watering device, in accordance with at least one embodiment.

The present specification describes a watering device for plants usable with a plant container. FIG. 1 is a perspective view a water reservoir 102, and two acrylic rods 104a, and 104b of a watering device 100, in accordance with at least one embodiment. The water reservoir tank 102 is adapted to contain a predefined amount of water to prevent overwatering. In an embodiment, the predefined amount of water is in the range of 115 mL to 120 mL. The water reservoir tank 102 is supported on the acrylic rods 104a, and 104b which can be inserted directly into the plant container.

Figure 2:
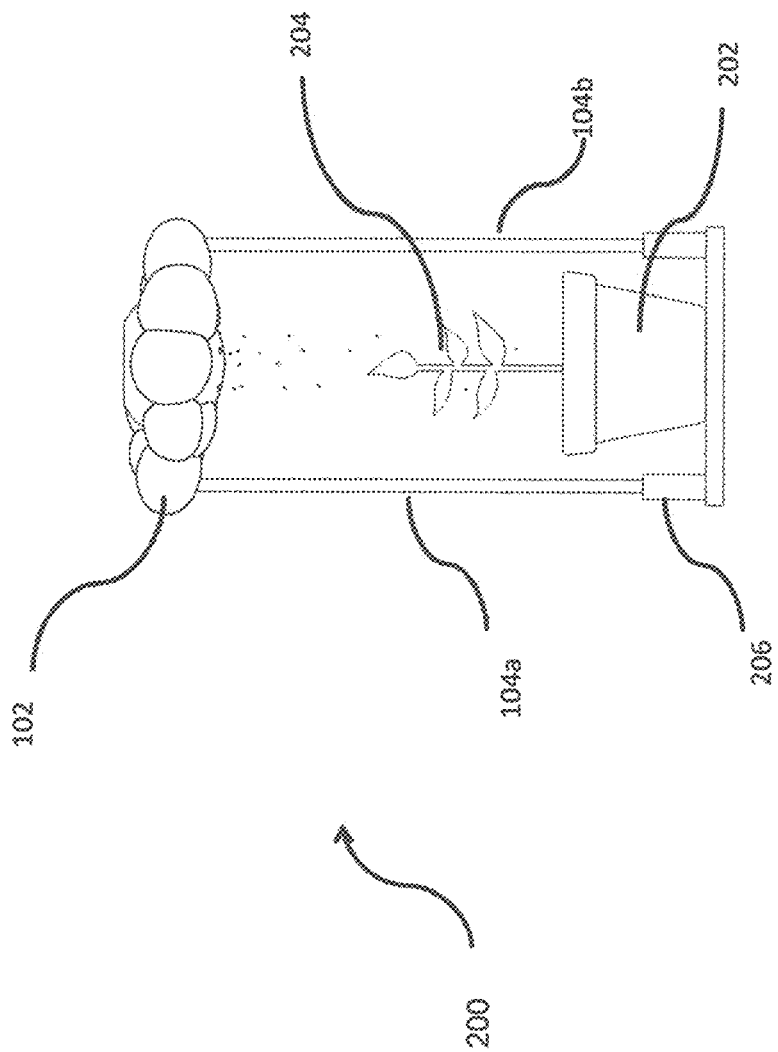
FIG. 2 is an installed view of the watering device for plants usable with a plant container and a stand, in accordance with at least one embodiment.

FIG. 2 is an installed view 200 of the watering device 102 for plants 204 usable with a plant container 202, in accordance with at least one embodiment. The acrylic rods 104a, and 104b can be inserted directly into the plant container 202 or a stand 206 for smaller pots. FIG. 2 is explained in conjunction with FIG. 1. In an embodiment, the two acrylic rods 104a, and 104b are clear/transparent acrylic rods. Being clear or/transparent the two acrylic rods 104a, and 104b blend in with the color of the plant and look like water. The two acrylic rods 104a, and 104b include top ends 106a, and 106b, and bottom ends 108a, and 108b. In an embodiment, the bottom ends 108a, and 108b of the two acrylic rods 104a and 104b are green tips that are an optional feature that is not necessary and not used when used with a stand, only used when directly in a plant pot. The green tips can be easily applied and removed depending on whether the acrylic rods 104a and 104b is being utilized for a plant container 202 or a stand 206.

FIG. 3A is a perspective view of the two acrylic rods inserted into the water reservoir tank, in accordance with at least one embodiment. The top ends 106a, and 106b of the two acrylic rods 104a and 104b are detachably attached to a proximal end 302a (shown in FIG. 3B) and a distal end 302b of the water reservoir tank 102. The bottom ends 108a, and 108b of the two acrylic rods 104a, and 104b are adaptable to be inserted into plant container 202 to allow the water reservoir tank 102 to be suspended on the two acrylic rods 104a, and 104b. In an embodiment, the bottom ends 108a, and 108b of the two acrylic rods 104a and 104b act as a stand so that the water reservoir tank is used for a small plant.

FIG. 3B is a cross-sectional view of the watering device that depicts how the top portion of the two acrylic rods can be detachably attached to a proximal end. The top ends 106a, and 106b of the two acrylic rods 104a and 104b are detachably attached to a proximal end 302a and a distal end 302b of the water reservoir tank 102.

Figure 4:
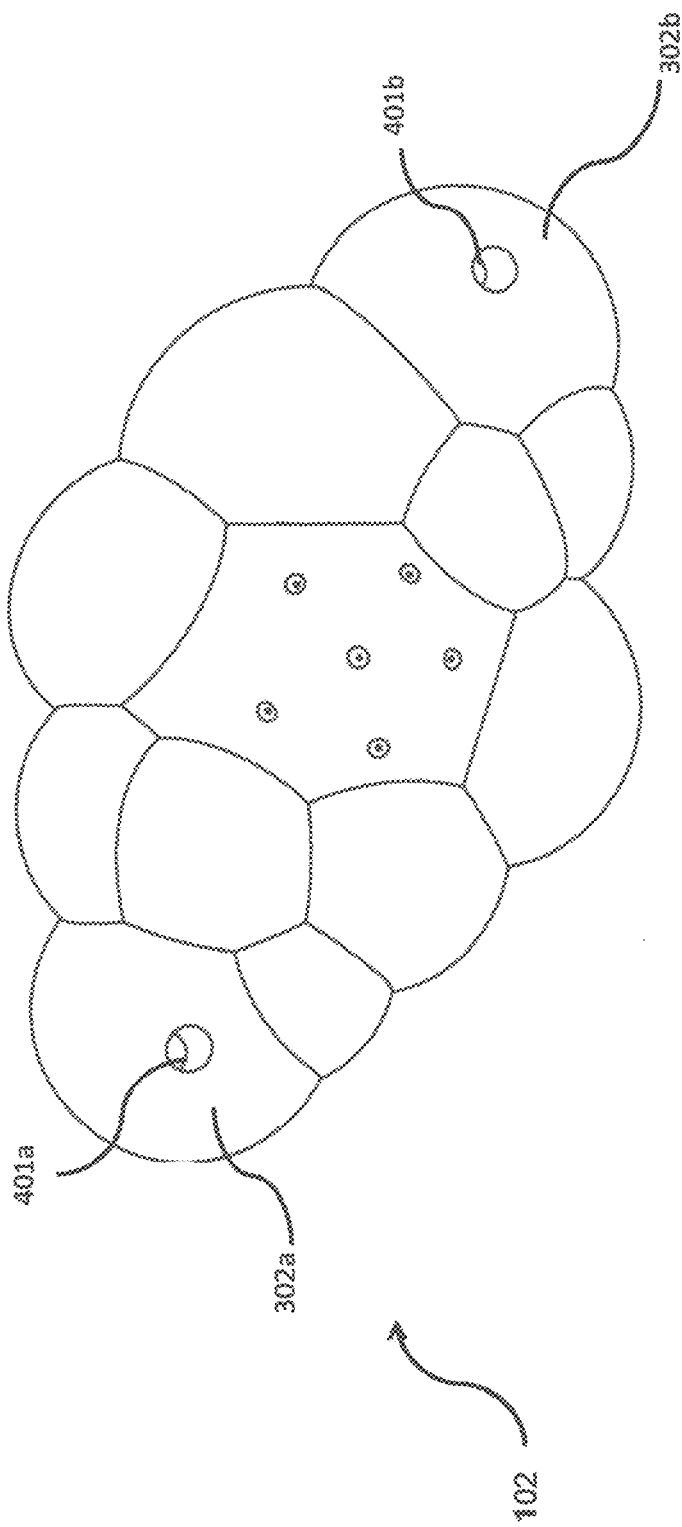
FIG. 4 is a perspective view of the water reservoir tank, in accordance with at least one embodiment.

FIG. 4 is a perspective view of the water reservoir tank 102, in accordance with at least one embodiment. The water reservoir tank 102 includes a proximal end 302a and a distal end 302b to secure the top ends 106a, and 106b of the two acrylic rods 104a, and 104b. The water reservoir tank 102 has a shape of a puffy cloud sitting over the plant that has to be poured with water. The water slowly drips overtime looking like a gentle rain. The water reservoir tank 102 is both aesthetically pleasing and allows for the plant to absorb the water more slowly which can be a benefit for some plants.

In an embodiment, the bottom portion 504 of the water reservoir tank 102 includes a first aperture 401a and a second aperture 401b. The first aperture 401a and the second aperture 401b are configured to receive the top ends 106a, and 106b of the acrylic rods 104a, and 104b.

FIG. 5A is a perspective view of various drip holes 402a, 402b, and 402c of the water reservoir tank 102, in accordance with at least one embodiment. The water reservoir tank 102 comprises a plurality of drip holes 402a, 402b, and 402c to create a plurality of individual water drops 404a, 404b, and 404c to provide a pleasing aesthetic effect. In an embodiment, the drip holes 402a, 402b, and 402c are designed to include cone shaped body extending downward to the drip holes so that water builds into small droplet shapes. In an embodiment, the water from the water reservoir tank is emptied in about 8-10 minutes.

Figure 5B:
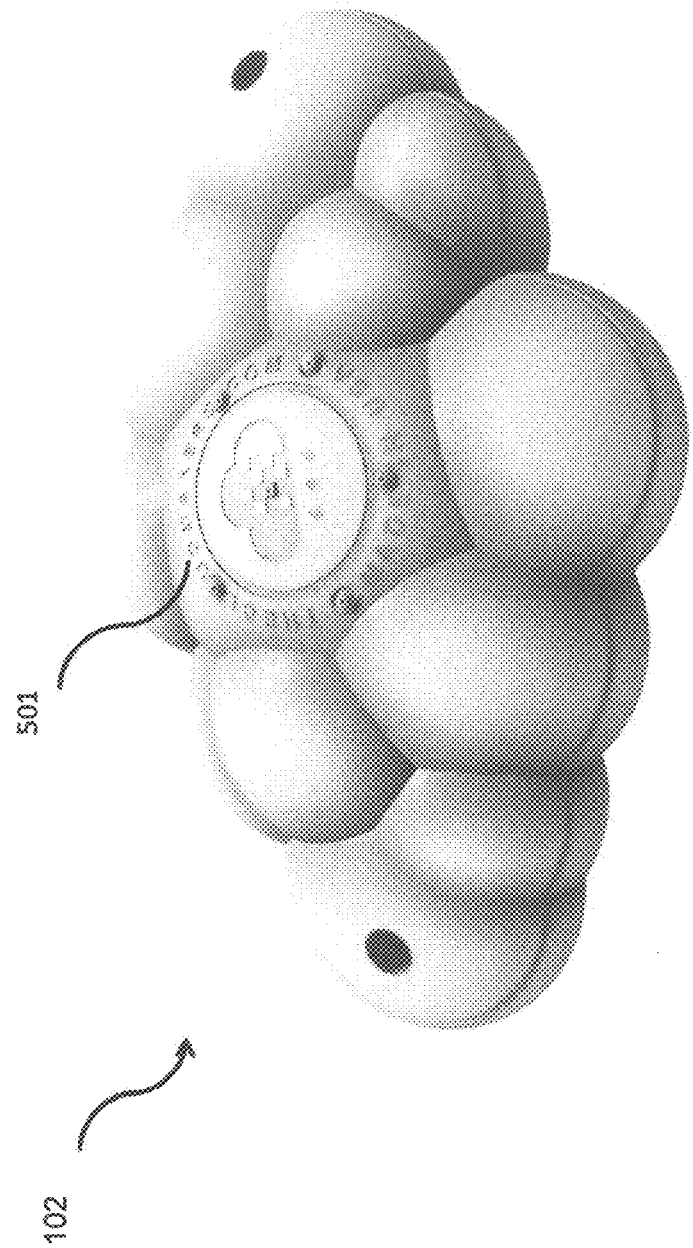
FIG. 5B is a bottom view of a textured bottom surface of the water reservoir tank, in accordance with at least one embodiment.

FIG. 5B is a bottom view of a textured surface 501 of the water reservoir tank 102, in accordance with at least one embodiment. The bottom portion of the water reservoir tank 102 has a textured surface to ensure that the water won't wick and travel horizontally. In case, someone slightly overfills the water reservoir tank 102, the textured surface prevents the water from wicking along the bottom of the water reservoir tank 102.

Thus, the drip holes 402a, 402b, and 402c of the water reservoir tank 102 have a size and shape to make sure that the water stays as individual small droplets. The protruding cone shape of the drip holes 402a, 402b, and 402c ensure that the drops stay small and do not travel back towards the body of the cloud after leaving the water reservoir tank 102. It can be appreciated that the drip holes can be designed in any shape or size known in the art that improves the shape and appearance of the water drops.

Figure 6:
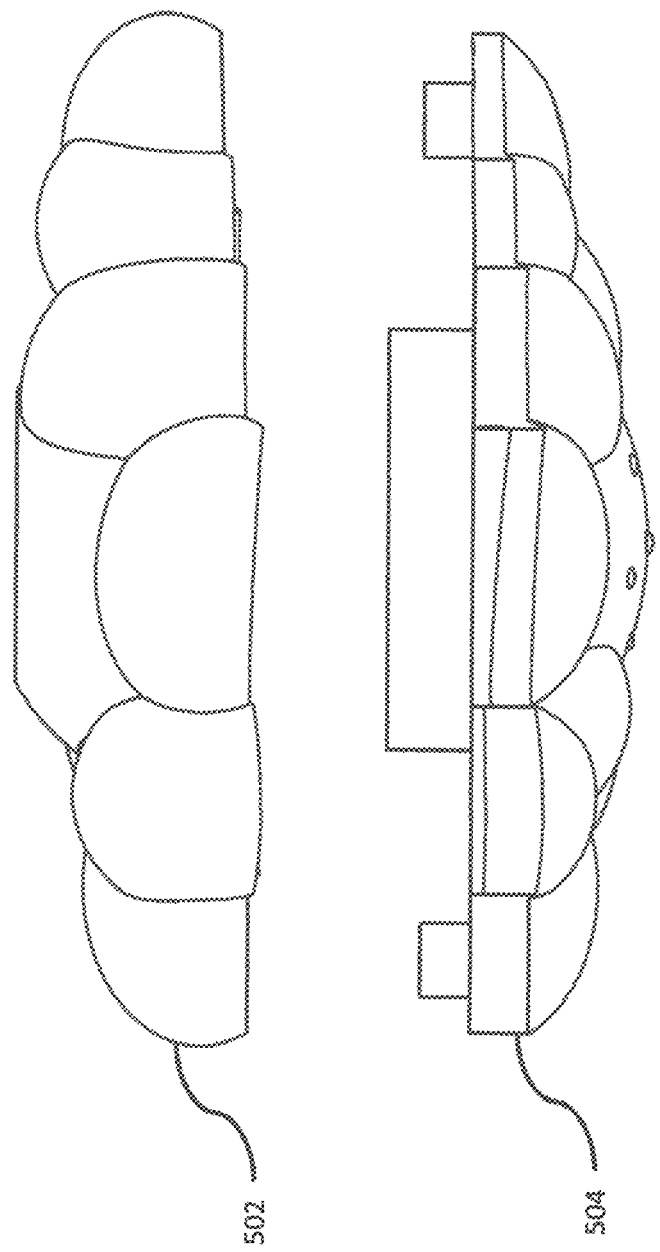
FIG. 6 is a perspective view of two separate molded portions of the water reservoir tank, in accordance with at least one embodiment.

FIG. 6 is a perspective view of two separate molded portions 502, and 504 of the water reservoir tank 102, in accordance with at least one embodiment. The water reservoir tank 102 is molded in a shape of a puffy cloud being cast into two separate molded portions comprising a top portion 502 and a bottom portion 504. In an embodiment, the water reservoir tank 102 includes an exterior shape designed to prevent the water from pooling into one big drop. In an embodiment, the angled interior shape ensures that the water reservoir tank 102 empties fully (no water pooling). Typically, having the water stored more vertically keeps the pressure as a downward force, while putting the same amount of water in a more horizontal reservoir would create less downward pressure.

Figure 7:
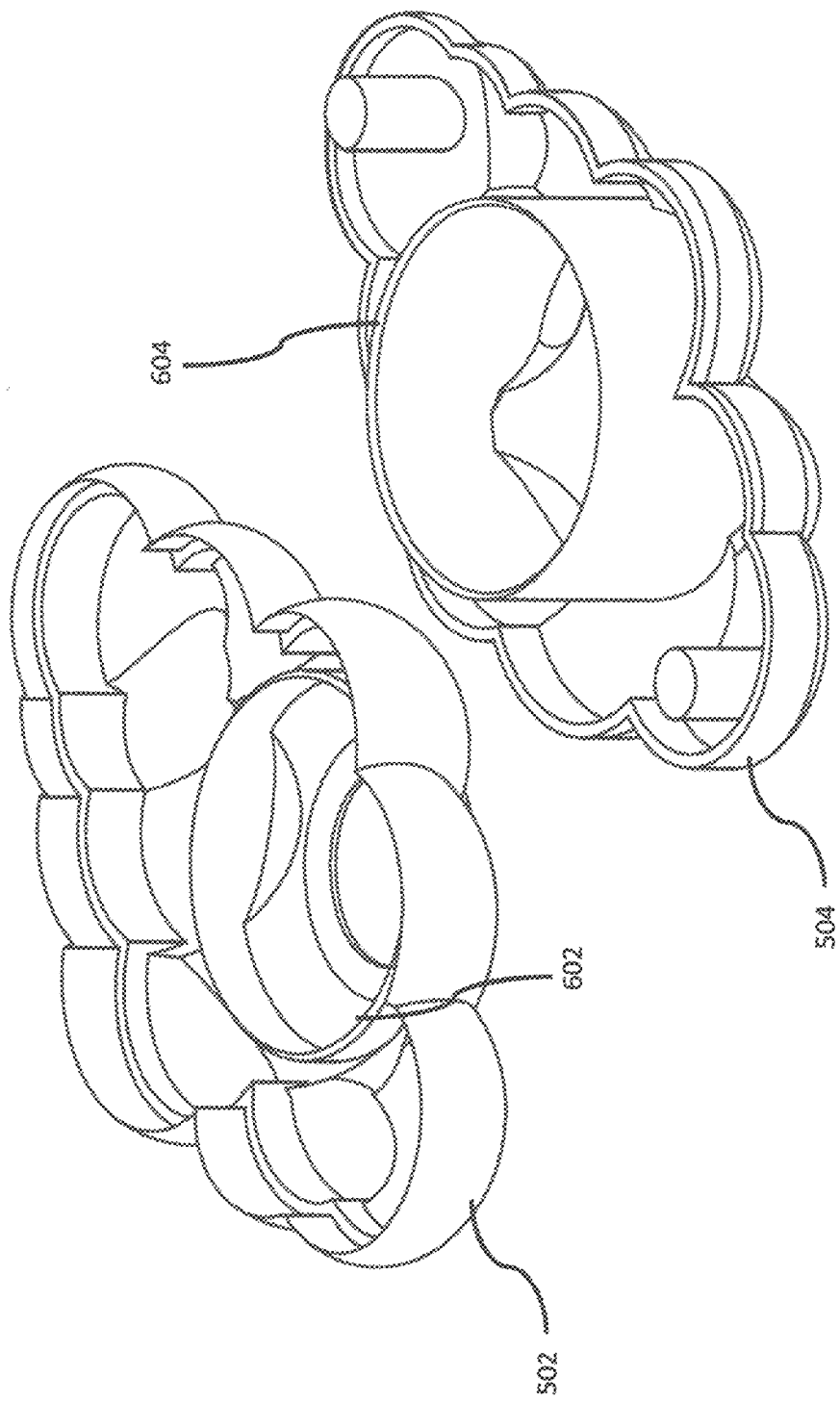
FIG. 7 is an open view of two separate molded portions of the water reservoir tank, in accordance with at least one embodiment.
Figure 8:
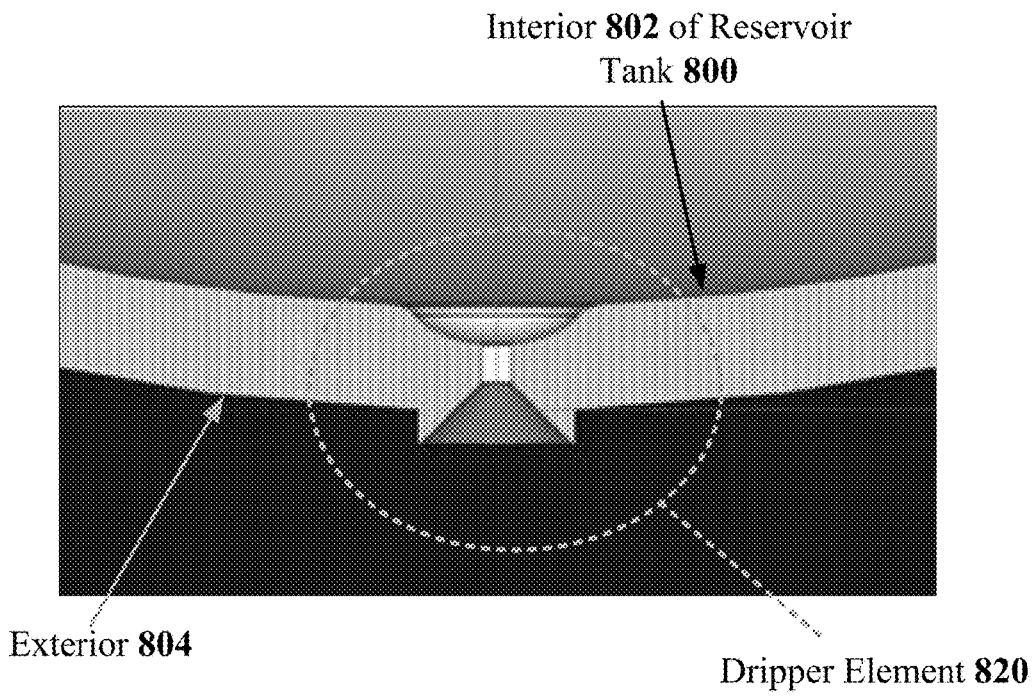
FIG. 8 is a cross sectional view of a portion of an embodiment including a reservoir tank 800 including one or more dripper elements 820 having portions extending downwardly from the downwardly facing exterior 804 of the reservoir tank 800. The dripper element 820 facilitates the flow of water from the interior of the reservoir tank 800 into discrete droplets having a particularly desirable "raindrop" type action, which coordinates well with the cloud shaped exterior shape of the reservoir tank 800, such as is shown in earlier drawings.

FIG. 7 is an open view of two separate molded portions of the water reservoir tank, in accordance with at least one embodiment. In an embodiment, the top portion 502 comprising a female attachment means 602 and the bottom portion 504 comprising a male attachment means 604. The depiction also shows the closed end of the first aperture 401a and second aperture 401b.

The female attachment means 602 and the male attachment means 604 to allow the two separate molded portions 502, and 504 of the water reservoir tank 102 to be detachably attached. In an embodiment, the water reservoir tank 102 is configured such that the male attachment means 604 is insertable into the female attachment means 602 for a snap-fit engagement. In an embodiment, the female attachment means 602 and the male attachment means 604 are placed in a center of each separate molded portion. In an embodiment, the female attachment means 602 and the male attachment means 604 are surrounded by a silicone material to provide a tighter fit. In an embodiment, the two separate molded portions facilitate a user to open and clean the water reservoir tank 102.

Thus, the present invention provides a water reservoir tank designed to hold a reasonable amount of water to prevent overwatering. Further, the acrylic rods are adaptable to existing potted plants, and there is no need to use a specific pot. Additionally, the drip holes are specifically made to create small individual drops making sure it has a pleasing aesthetic effect. Furthermore, the water reservoir tank can be separated into two parts so that the user can open it up for cleaning.

ADDITIONAL ELEMENT LIST

Here is a list of the various additional elements:
LDR lower drip ring
12-D droplet; 13-D droplet; 14-D droplet;
15A-D droplet; 15B-D droplet; 15C-D droplet
16A-D droplet; 16B-S stream
17A-D droplet; 17B-D droplet; 17C-D droplet; 17D-D droplet 17E-D droplet; 17F-D droplet; 17G-D droplet; 1711-D droplet
800 Reservoir Tank (could include two or more pieces)
801 Lower Floor of Reservoir Tank
802 Tank Interior
804 Tank Exterior
805 Lower floor central bulge
820 Dripper element
821 Passageway (a through void defined by the tank floor)
824 Through channel cavity
824P Through channel portion
825 Inlet cup
826 Diverging Cone Frustrum Cavity
826-P Diverging Cone Frustrum Portion
826-D Diverging Cone Frustrum Portion Outer Ring Diameter
828 Downward protrusion (extends distance "d")

Drippers With Inverted Cone Frustrum Configuration

General Construction and Operation

Reference is now generally made to FIGS. 8-11, which show an additional dripper improvement including a new design to drip water onto plants. This particular dripper element shape is created to make an improved, slow pleasing rain onto the houseplant awaiting below. The dripper elements have a portion extending downwardly from the body of the reservoir and have, in one configuration, holes less than a millimeter in diameter (0.6 mm) that open into an inverted cone shape, also referenced as a "downwardly opening cone frustrum". The small diameter of the holes keeps the water from emptying too fast. The extension from the main body focuses the water downward and does not follow the shape of the outside of the reservoir.

The downwardly opening cone frustrum shape serves two purposes. The first purpose is that the circumference of the cone portion surrounds the water and shapes it into tiny individual droplets instead of large pooling drops. The second purpose of the cone frustrum shape is that the greater surface area the water has as it exits the 0.6 mm hole, the more it continues to draw more water out, overcoming the surface tension and lowered pressure problems from certain other configurations.

One particular aspect of the invention was to contain the water in small discrete droplets. The exit cone frustrum opens at an angle from where the channel exits the body of the reservoir allowing for the water to come in contact with a greater surface area. This exit cone frustrum however extends beyond the lower surface of the adjacent reservoir wall containing the water so that it remains discrete droplets.

Thus it may be seen that the combination of a small diameter channel extending perpendicular to the ground from the body of the reservoir, the exit cone frustrum allowing for greater cohesive attraction as the water falls, and the extended wall of the dropper containing the water work together to create a consistent droplet providing a pleasurable and desirable aesthetic.

The Dripper Elements 820

Figure 9:
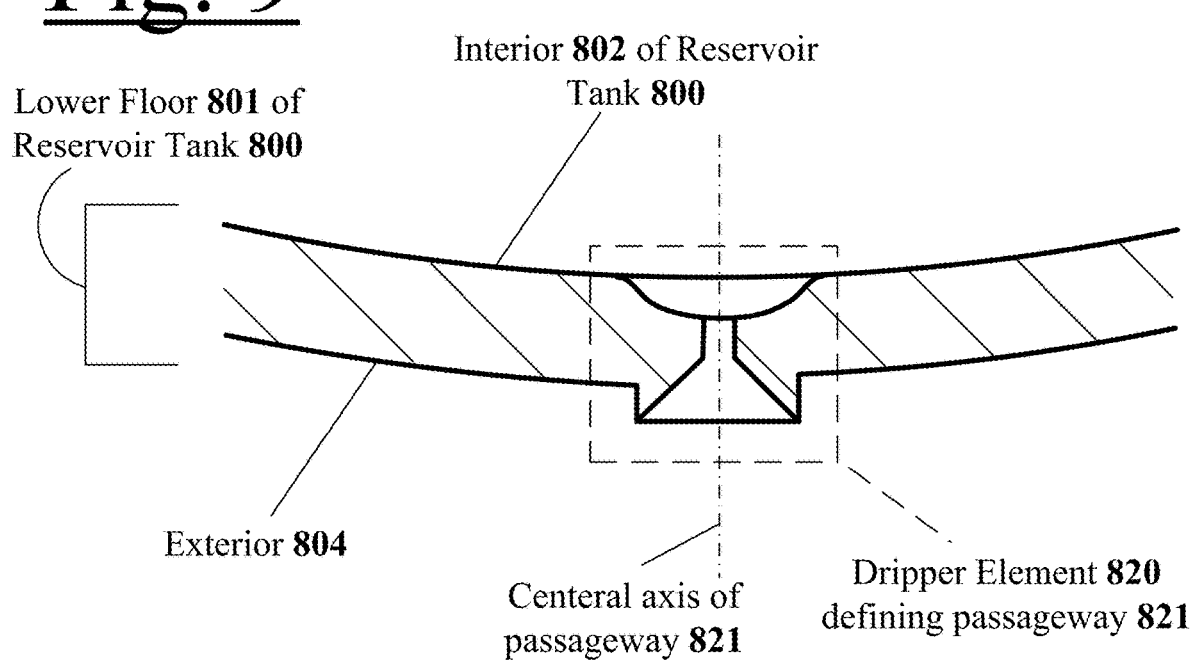
FIG. 9 is a simplified cross sectional view of a portion of an embodiment including a reservoir tank 800 having a lower floor 801 defining an interior surface 802 and an exterior surface 804. Also shown is a single dripper element 820, which is part of the lower floor, which defines a passageway 821 allowing water flow therethrough.
Figure 10:
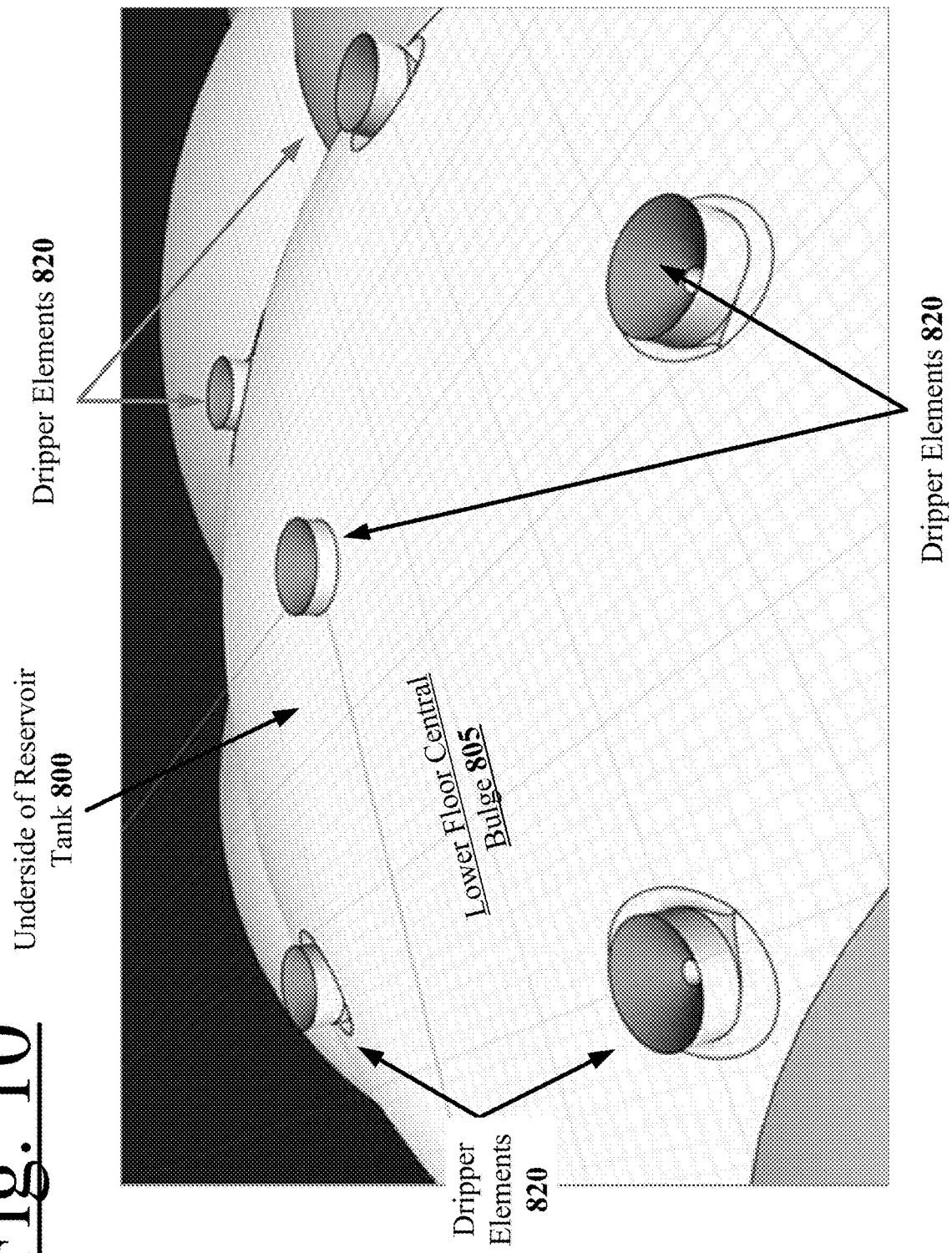
FIG. 10 is a view of the underside of reservoir tank 800, as if the viewer was viewing it turned upside down. Shown are six (6) dripper elements 820, one being in the center, and the other five being evenly distributed around the one in the center. As may be seen, the external shape of the reservoir tank is shaped such that the overall reservoir, when inverted, simulates a "puffy cloud". In the embodiment shown, the dripper elements 820 are all located within a centrally located lower floor central "bulge" 805, but it should be understood that the elements could likewise be provided in the bottom of the other "bulges" shown in FIG. 10, as well as previous FIG. 4. It may be understood that the drippers face directly down, and do not follow the contour of the underside of the reservoir, although this is an alternative option.

Referencing the embodiment shown in FIG. 9, the dripper elements 820 are part of the lower floor 801 of the reservoir tank 800. It may be understood in this configuration that that such dripper elements are generally defined as in the dotted rectangle shown in FIG. 9, although the location of this border is not critical, except that it should be understood to include the downward protruding portion discussed later as 828, and should include the through channel (including the inlet cup), and inverted exit cone segment likewise discussed later.

Figure 11:
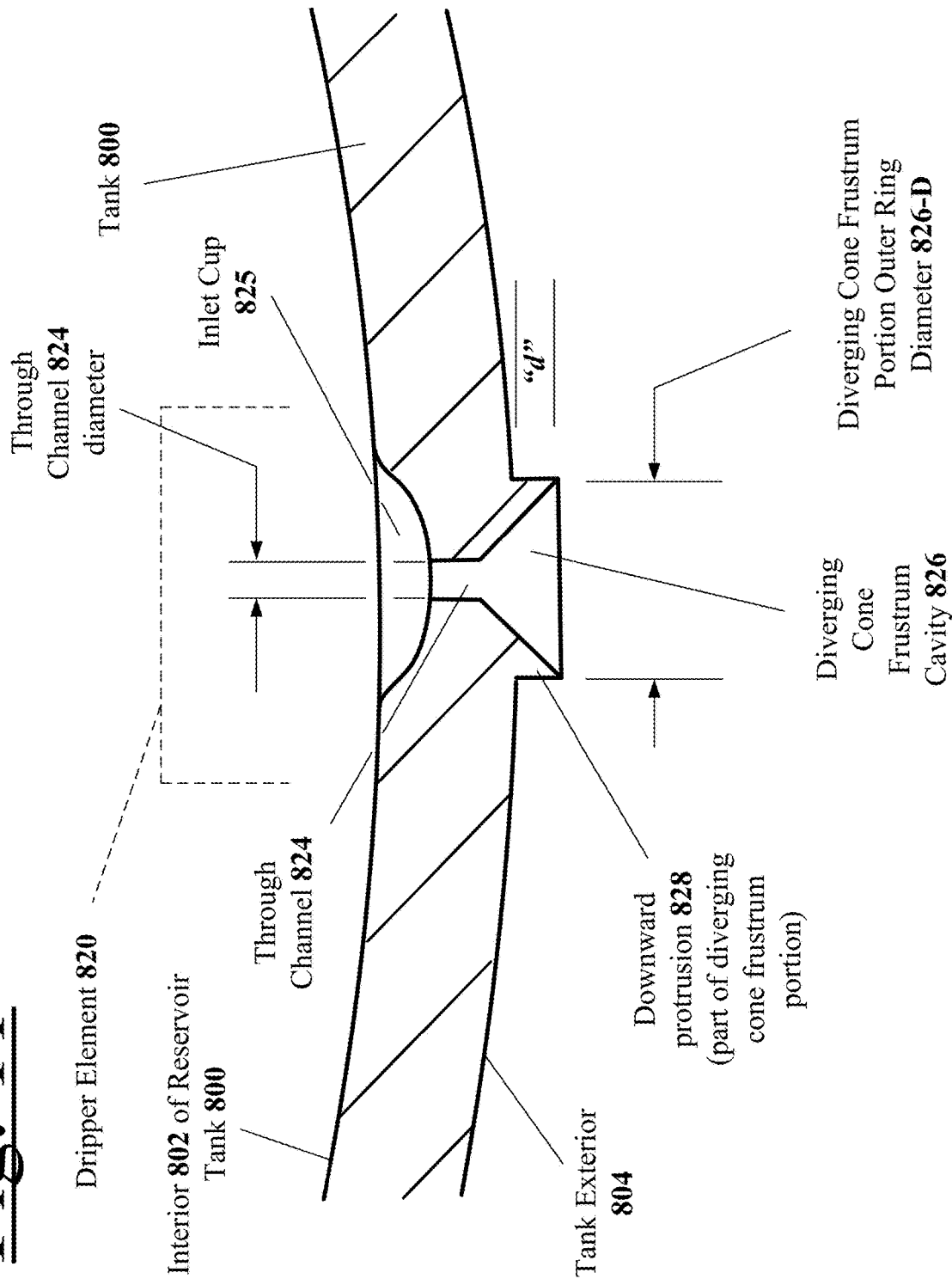
FIG. 11 is a view similar to FIG. 9, with additional details shown. These additional details include the passageway 821 (of FIG. 9), which includes an upwardly directed through channel 824 including an upwardly directed inlet cup 825, and a diverging cone frustrum portion 826 at least partially defined by a downwardly extending protrusion 828 that extends downwardly from the lower surface of the reservoir by a distance shown as "d".
Figure 12:
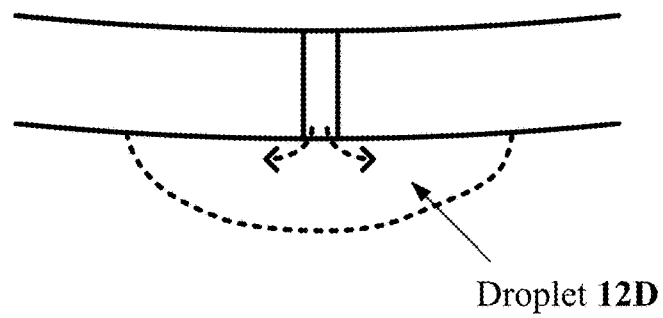
FIG. 12 is a view of a comparative droplet.
Figure 13:
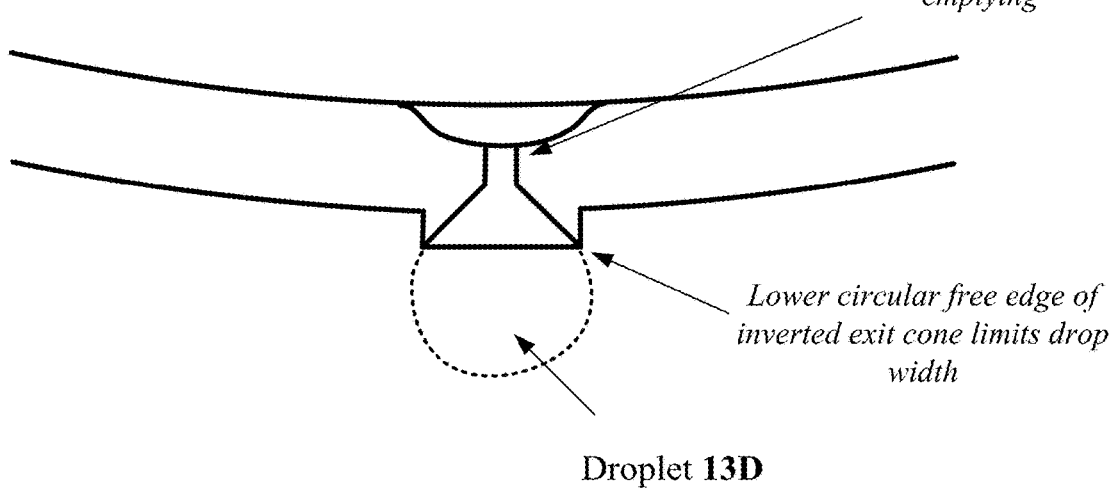
FIG. 13 is a view of a droplet falling from an inverted cone according to the present invention.

Referring now also to FIG. 11, passageway 821 of FIG. 9 includes a through channel cavity 824 (including an inlet cup 825), and a diverging cone frustrum cavity 826 at least partially defined by a downwardly extending protrusion 828 that extends downwardly from the lower surface of the reservoir by a distance shown as "d". As water passes through the passageway from the interior of the reservoir tank 800, it first enters the inlet cup 825, then passes through the remainder of the through channel 824, and finally exits via the inverted exit cone 826.

While the dripper elements 820 are part of the lower floor 801 of the reservoir tank 800, the dripper elements could in a separate embodiment be initially manufactured separately, and installed into accompanying through holes defined in the lower floor of the reservoir tank, and attached thereto with adhesive and/or fusion between such separate dripper elements and the lower floor. Necessary sealing at the interface of such elements can be done such as known in the art.

Figure 18:
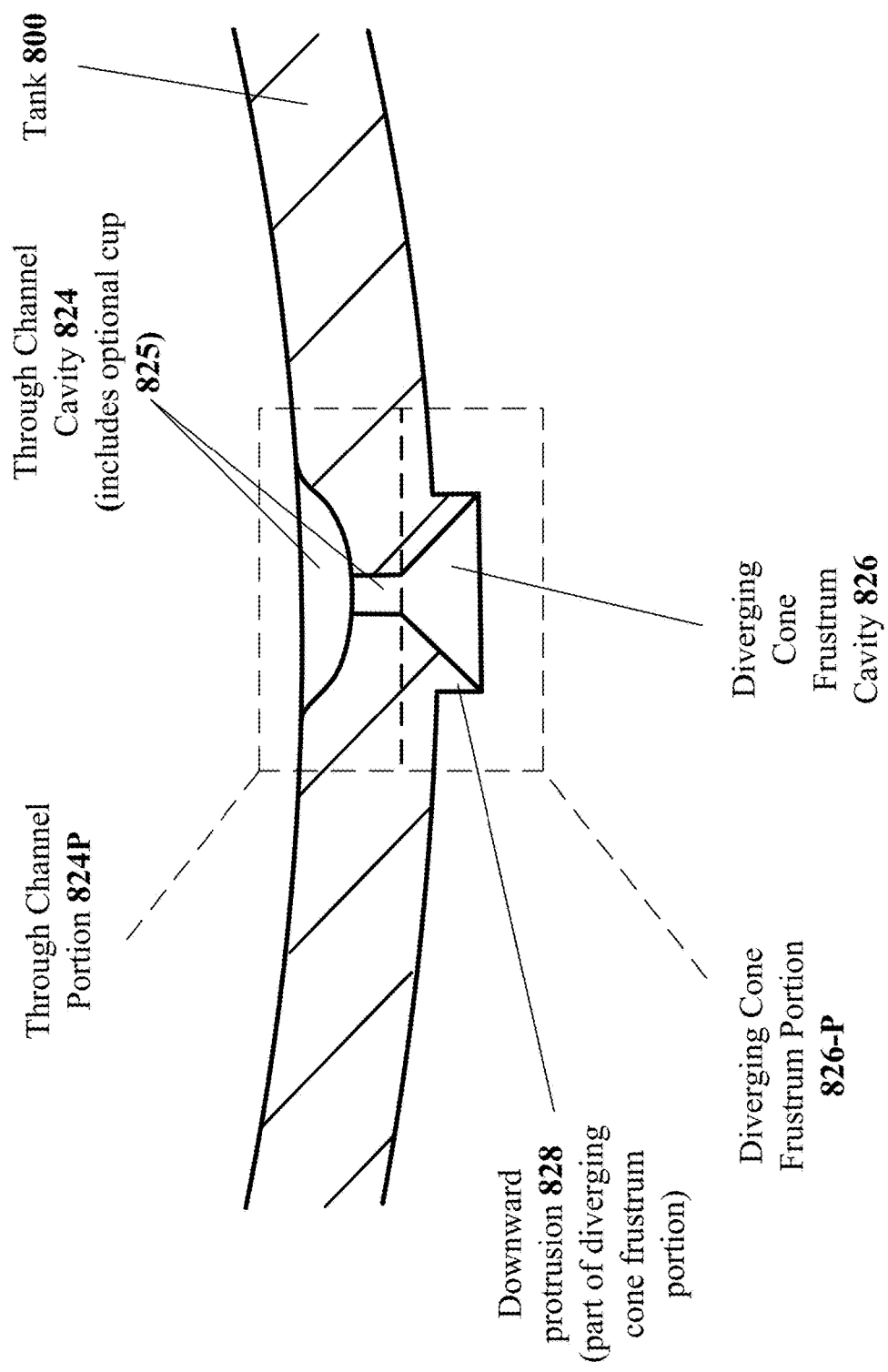
FIG. 18 is a view similar to FIG. 9, except that it shows the through channel portion 824-P which is adjacent to the diverging cone frustrum portion 826-P, which combine to form a complete dripper element 820 (see FIG. 9). The through channel portion 824-P defines the through channel cavity 824, and the diverging cone frustrum portion 826-P defines the diverging cone frustrum cavity 826.

FIG. 18 is a view similar to FIG. 9, except that it shows the through channel portion 824-P which is adjacent to the diverging cone frustrum portion 826-P, which combine to form a complete dripper element 820 (see FIG. 9). The through channel portion 824-P defines the through channel cavity 824, and the diverging cone frustrum portion 826-P defines the diverging cone frustrum cavity 826.

It should be understood that all dripper elements shown are round, in that they have consistent cross sections as taken at different orientations through the central vertical axis.

Inlet Cup 825

The inlet cup 825 is there as a function of one manufacturing technique. The "pins" we used in manufacturing are fixed in place in the mold but replaceable. Because of the small diameter of the "hole" they are a potential failure point for the mold (i.e. they are a thin piece of steel under high pressure). The inlet cup is to prolong the life cycle of the pins.

The Through Channel 824

The through channel 824 accepts water from the exit end of the inlet cup 825, and passes said water downwardly to the inverted cone below.

In one preferred embodiment, the through channel 824 is circular in cross section, 1.7 mm in length and 0.6 mm in diameter, with that ratio is approximately 1:3.

Other dimensions are possible while still providing suitable droplet characteristics. For example, the channel diameter can range from 0.2 mm to 0.8 mm.

The Inverted Cone Frustrum 826

A close review of the "inverted cone" element 826 in, for example, FIG. 11, reveals that it is technically a cone "frustum" 826. The frustum of a cone is the part of the cone without vertex when the cone is divided into two parts with a plane that is parallel to the base of the cone.

In one preferred embodiment, the downwardly opening cone frustrum 826 extends downwardly and laterally outwardly at a 45 degree angle. However, this should not be over strictly limiting (Ex: 30°, 45°, 60°). Theoretically if the channel had a smaller diameter, one could likely decrease the angle to be more gradual to create draw.

It may be understood that the inverted cone (aka downwardly opening cone frustrum) configuration provides what could be referenced as a "continuous momentum" action, This outwardly expanding cone (Ex: 30°, 45°, 60° helps maintain a greater volume of water below the channel due to surface tension in order to encourage water to keep flowing down the channel, thus emptying the container above as much as possible. When enough water is maintained below and outside of the channel after it drips, water continues to flow. If the amount of water outside the channel isn't suitable in side compared to that in the channel, then surface tension can win out over gravity stopping the flow as the amount of natural pressure from the water volume above decreases.

Downward Protrusion 828

In one preferred embodiment, the minimum distance needed to protrude from the surface of the reservoir is approximately 0.5 mm. This distance can be increased, but at the risk of reducing the preferred "soft cloud" shape of the reservoir. Furthermore, a much longer protrusion could have negative surface tension aspects.

Method of Operation

Typical operation is as follows. Water is suspended in a 2-12 ounce container above the plant for slow watering.

Operation is under regular ambient atmospheric pressure. No added interior pressure other than gravity is used, and no negative pressure is used like in thumb waterers or vacation watering bulbs.

Composition

Composition of the reservoir is of non-porous material, including but not limited to Molded ABS, PLA PETG, ABS or PP Plastics. This provides an impervious surface defining the passageway within the drippers. Such an impervious surface is a clear distinction from prior art FDM printing, which creates a porous surface with different wetting characteristics.

Additional Comments re Other Unique Features

As noted above, the cone frustrum configuration provides what could be referenced as a "continuous momentum" action, This helps maintain a greater volume of water below the channel due to surface tension in order to encourage water to keep flowing down the channel, thus emptying the container above as much as possible. When enough water is maintained below and outside of the channel after it drips, water continues to flow. If the amount of water outside the channel isn't suitable inside compared to that in the channel, then surface tension can win out over gravity stopping the flow as the amount of natural pressure from the water volume above decreases.

It may be understood that a downwardly opening cone frustrum falls under the general category of an "expanded cavity" which is larger than the channel and accumulates the greater volume of water. Other examples of expanded cavities include that shown in FIG. 17E, FIG. 17F, FIG. 17G, FIG. 19A, FIG. 19B, and FIG. 19C.

Figure 19A:
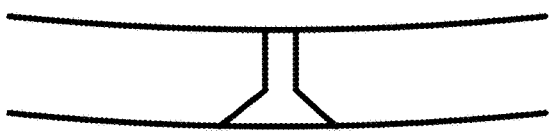
FIG. 19A is a configuration including an expanded cavity at the end of the passageway with the cavity being a cone frustrum, but with no downward protrusion.
Figure 19B:
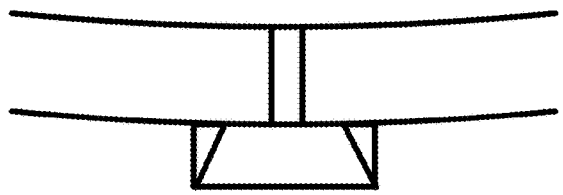
FIG. 19B is a configuration including an expanded cavity at the end of the passageway with the cavity being a cone frustrum, but with there being an "outward step" from the lower end of the passageway to the inlet end of the frustrum.
Figure 19C:
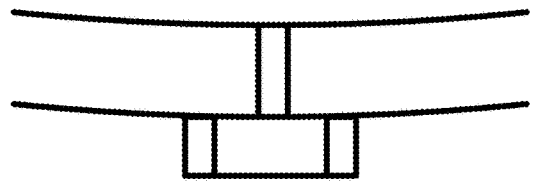
FIG. 19C is a configuration including an expanded cavity at the end of the passageway with the cavity being a right cylinder with no tapering sides, and including a downward protrusion.

In FIG. 19C, the expanded cavity has straight sides, providing a consistent transverse cross section throughout its length.

In FIG. 19B, the expanded cavity has outwardly diverging sides, providing an increasing transverse cross section as taken downwardly along its length. These sides could also be considered a cone frustrum.

Figure 17A:
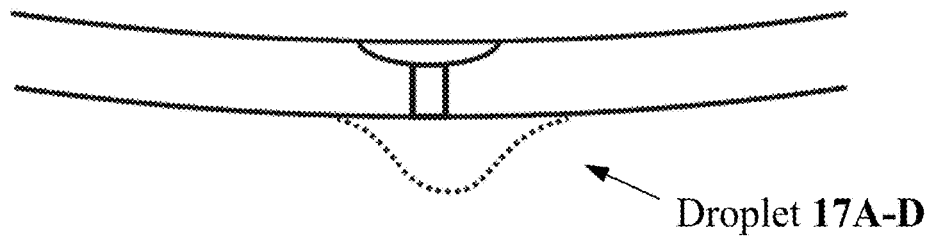
FIGS. 17A-H are various views of a droplet falling from various configurations.
Figure 17B:
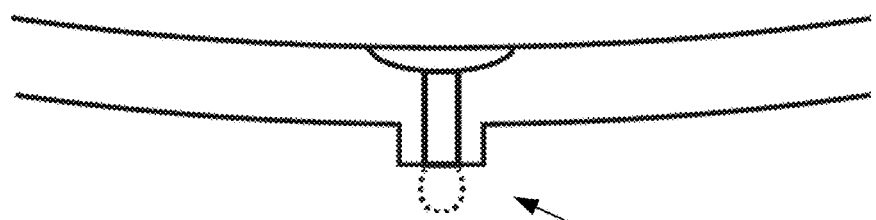
Figure 17C:
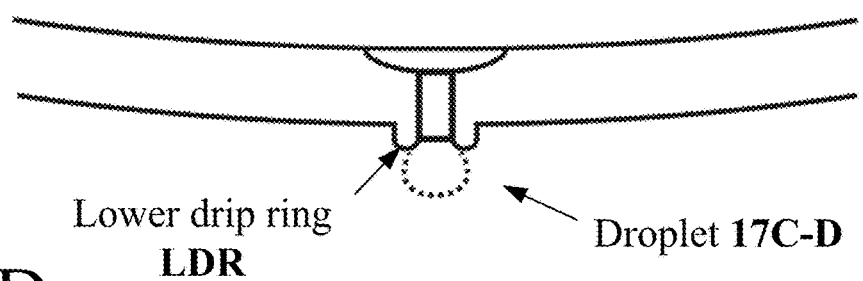
Figure 17D:
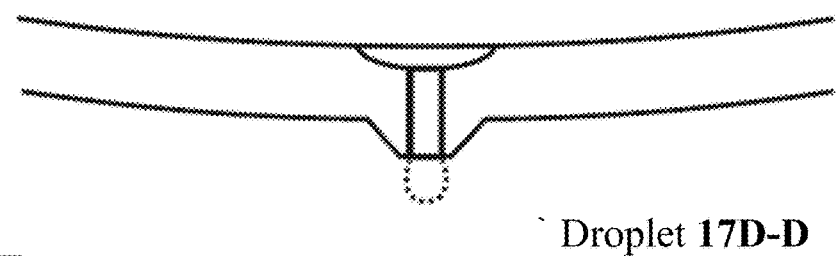
Figure 17E:
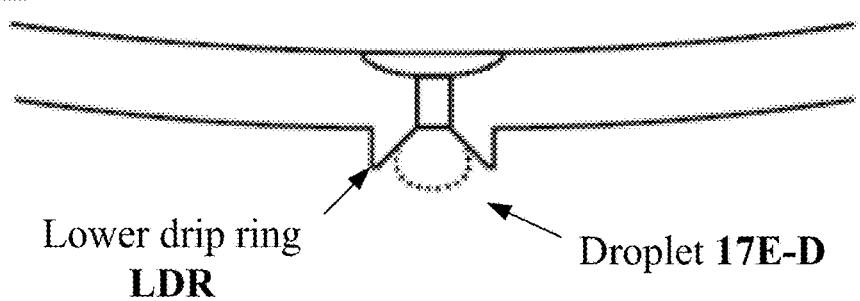
Figure 17F:
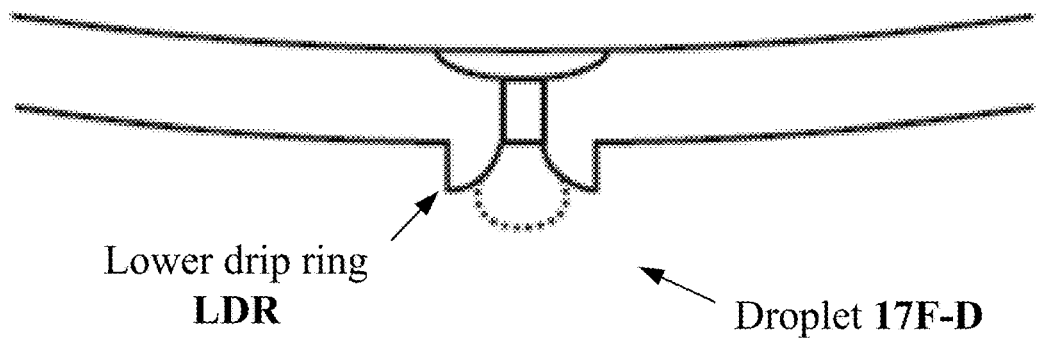
Figure 17G:
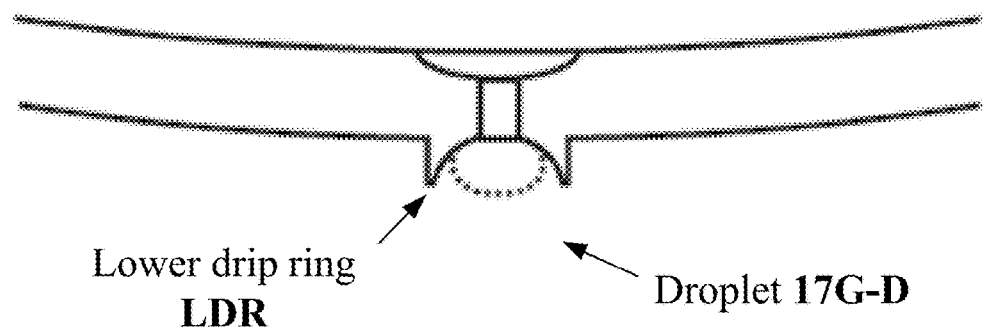
Figure 17H:
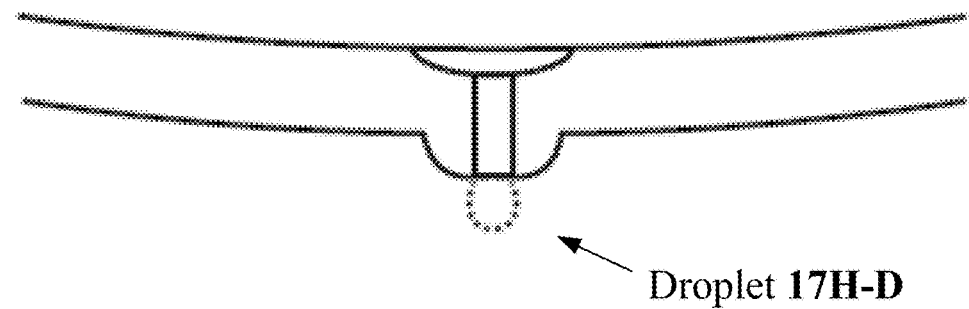

Downward protrusions can be used with or without a cone frustrum or other expanded cavity. FIGS. 17B, 17C, 17D, for example, show downward protrusions. FIGS. 17C FIG. 17E, FIG. 17F, and FIG. 17G are examples of downward protrusions which define a lower drip ring LDR which is circular and greater in diameter than the through channel cavity. In these cases, the lower drip ring LDR is defined by the lowest part of the downward protrusion. The existence of the lower drip ring discourages water from migrating outwardly past the lower drip ring, thus limiting the lateral migration of the water.

Advantages and Features

Advantages and features of this system include many. It may be seen that the combination of a small diameter channel extending perpendicular to the ground from the body of the reservoir, the exit cone frustrum allowing for greater cohesive attraction as the water falls, and the extended wall of the dropper containing the water work together to create a consistent droplet providing a pleasurable and desirable aesthetic.

CONCLUSION

A person with ordinary skills in the art will appreciate that the apparatuses and devices have been illustrated and explained to serve as examples and should not be considered limiting in any manner. It will be further appreciated that the variants of the above-disclosed system elements, modules, and other features and functions, or alternatives thereof, may be combined to create other different apparatuses, systems, or applications.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims. As many possible embodiments may be made of the invention without departing from the scope thereof, it is to be understood that all matter herein set forth or shown in the accompanying drawings is to be interpreted as illustrative and not in a limiting sense.

Various modifications and variations can be made in the present invention without departing from the spirit or scope of the invention.

It will be understood that certain features and sub combinations are of utility and may be employed without reference to other features and sub combinations. This is contemplated by and is within the scope of the claims.

The invention claimed is:

1. A novelty watering device for use in watering a plant positioned in a planting container, said watering device comprising:
   A) A reservoir member configured to at temporarily contain a predetermined amount of water, such that said water drips in individual droplets of water downwardly therefrom, said reservoir member including a lower floor, said lower floor comprising:
     1) a lower floor portion defining an upwardly facing reservoir portion configured to contain a volume of water;
     2) a dripper element configured to allow the passage of water, said dripper element comprising:
       i) a through channel portion defining a through channel cavity having a channel inlet end and a channel outlet end, said channel inlet end for accepting a portion of said volume of water from said upwardly facing reservoir portion into said through channel cavity, and said outlet end for routing said water portion out of said through channel portion;
       ii) a diverging cone frustrum portion defining a diverging cone frustrum shaped cavity having a cone inlet end and a cone outlet end, said cone inlet end configured to accept water from said channel outlet end such that said diverging cone frustrum shaped cavity accumulates a volume of water therein, prior to said volume of water becoming separated into a discrete drop and falling from said diverging cone frustrum portion; and B) at least one support member configured to support said container above said planting container, such that individual droplets of water exit said dripper elements and fall upon said plant while in said planting container.

2. The novelty watering device as claimed in claim 1, wherein said through channel portion includes an upwardly directed inlet cup proximate said channel inlet end.

3. The novelty watering device as claimed in claim 1, wherein said through channel cavity is circular in cross section, 1.7 mm in length and 0.6 mm in diameter.

4. The novelty watering device as claimed in claim 1, wherein said diverging cone frustrum shaped cavity diverges at an angle a range of 40-50 degrees.

5. The novelty watering device as claimed in claim 1, wherein said diverging cone frustrum shaped cavity diverges at an angle in a range of 30-60 degrees.

6. A novelty watering device for use in watering a plant positioned in a planting container, said watering device comprising:

A) A reservoir member configured to temporarily contain a predetermined amount of water, such that said water drips in individual droplets of water downwardly therefrom, said reservoir member including a lower floor, said lower floor comprising:
1) a lower floor portion defining an upwardly facing reservoir portion configured to contain a volume of water, said lower floor portion defining a lower exterior surface portion; and
2) a dripper element configured to allow the passage of water, said dripper element comprising:
  i) a through channel portion defining a through channel cavity having a channel inlet end and a channel outlet end, said channel inlet end for accepting a portion of said volume of water from said upwardly facing reservoir portion into said through channel cavity, and said outlet end for routing said water portion out of said through channel portion; and
  ii) a diverging cone frustrum portion defining a diverging cone frustrum shaped cavity having a cone inlet end and a cone outlet end, said cone inlet end configured to accept water from said channel outlet end such that said diverging cone frustrum shaped cavity accumulates a volume of water therein, prior to said volume of water becoming separated into a discrete drop and falling from said diverging cone frustrum portion,
  said diverging cone frustrum portion including a downward protrusion portion, said downward protrusion portion extending downwardly a predetermined distance from said arcuate surface of said lower exterior surface portion of said lower floor portion, such that said volume of water while in said diverging cone frustrum shaped cavity is discouraged from migrating laterally to said lower floor portion; and B) at least one support member configured to support said container above said planting container, such that individual droplets of water exit said dripper elements and fall upon said plant while in said planting container.

7. The novelty watering device as claimed in claim 6, wherein said through channel portion includes an upwardly directed inlet cup proximate said channel inlet end.

8. The novelty watering device as claimed in claim 6, wherein said through channel cavity is circular in cross section, 1.7 mm in length and 0.6 mm in diameter.

9. The novelty watering device as claimed in claim 6, wherein said through diverging cone frustrum shaped cavity diverges at an angle in a range of 40-50 degrees.

10. The novelty watering device as claimed in claim 6, wherein said through diverging cone frustrum shaped cavity diverges at an angle in a range of 30-60 degrees.

11. A novelty watering device for use in watering a plant positioned in a planting container, said watering device comprising:

A) A reservoir member configured to temporarily contain a predetermined amount of water, such that water drips in individual droplets of water downwardly therefrom, said reservoir member itself including a lower floor, said lower floor comprising:
1) a lower floor portion defining an upwardly facing reservoir portion configured to contain a volume of water;
2) a dripper element configured to allow the passage of water, said dripper element comprising:
  i) a through channel portion defining a through channel cavity having a channel inlet end and a channel outlet end, said channel inlet end for accepting a portion of said volume of water from said upwardly facing reservoir portion into said through channel cavity, and said outlet end for routing said water portion out of said through channel portion; and
  ii) an expanded portion defining an expanded cavity having an expanded cavity inlet end and an expanded cavity outlet end, said cavity inlet end configured to accept water from said channel outlet end such that said expanded cavity accumulates a volume of water therein, prior to said volume of water becoming separated into a discrete drop and falling from said expanded cavity; and B) at least one support member configured to support said container above said planting container, such that individual droplets of water exit said dripper elements and fall upon said plant while in said planting container.

12. The novelty watering device as claimed in claim 11, wherein said through channel cavity is circular in cross section, 1.7 mm in length and 0.6 mm in diameter.

13. The device as claimed in claim 11, wherein said expanded portion has straight sides, providing a consistent transverse cross section of said expanded portion of said expanded cavity throughout the its length of said expanded portion.

14. The device as claimed in claim 11, wherein said expanded portion has outwardly diverging sides, providing an increasing transverse cross section of said expanded portion of said expanded cavity as taken downwardly along the length of said expanded portion.

15. A novelty watering device for use in watering a plant positioned in a planting container, said watering device comprising:

A) A reservoir member configured to temporarily contain a predetermined amount of water, such that water drips in individual droplets of water downwardly therefrom, said reservoir member including a lower floor, said lower floor comprising:
1) a lower floor portion defining an upwardly facing reservoir portion configured to contain a volume of water, said lower floor portion defining a lower exterior surface portion; and 2) a dripper element configured to allow the passage of water, said dripper element comprising:

a through channel portion defining a through channel cavity having a channel inlet end and a channel outlet end, said channel inlet end for accepting a portion of said volume of water from said upwardly facing reservoir portion into said through channel cavity, and said outlet end for routing said water portion out of said dripper element, said through channel portion including a downward protrusion portion, said downward protrusion portion extending downwardly a predetermined distance from said lower exterior surface portion of said lower floor portion, such that said volume of water while at the channel outlet end of said through channel cavity is discouraged from migrating laterally to said lower floor portion; and B) at least one support member configured to support said container above said planting container, such that individual droplets of water exit said dripper elements and fall upon said plant while in said planting container, wherein said downward protrusion portion defines a lower drip ring which discourages water from wicking radially relative to said ring, said lower drip ring being larger in diameter than said through channel cavity.

* * * * *